Patented Aug. 1, 1950

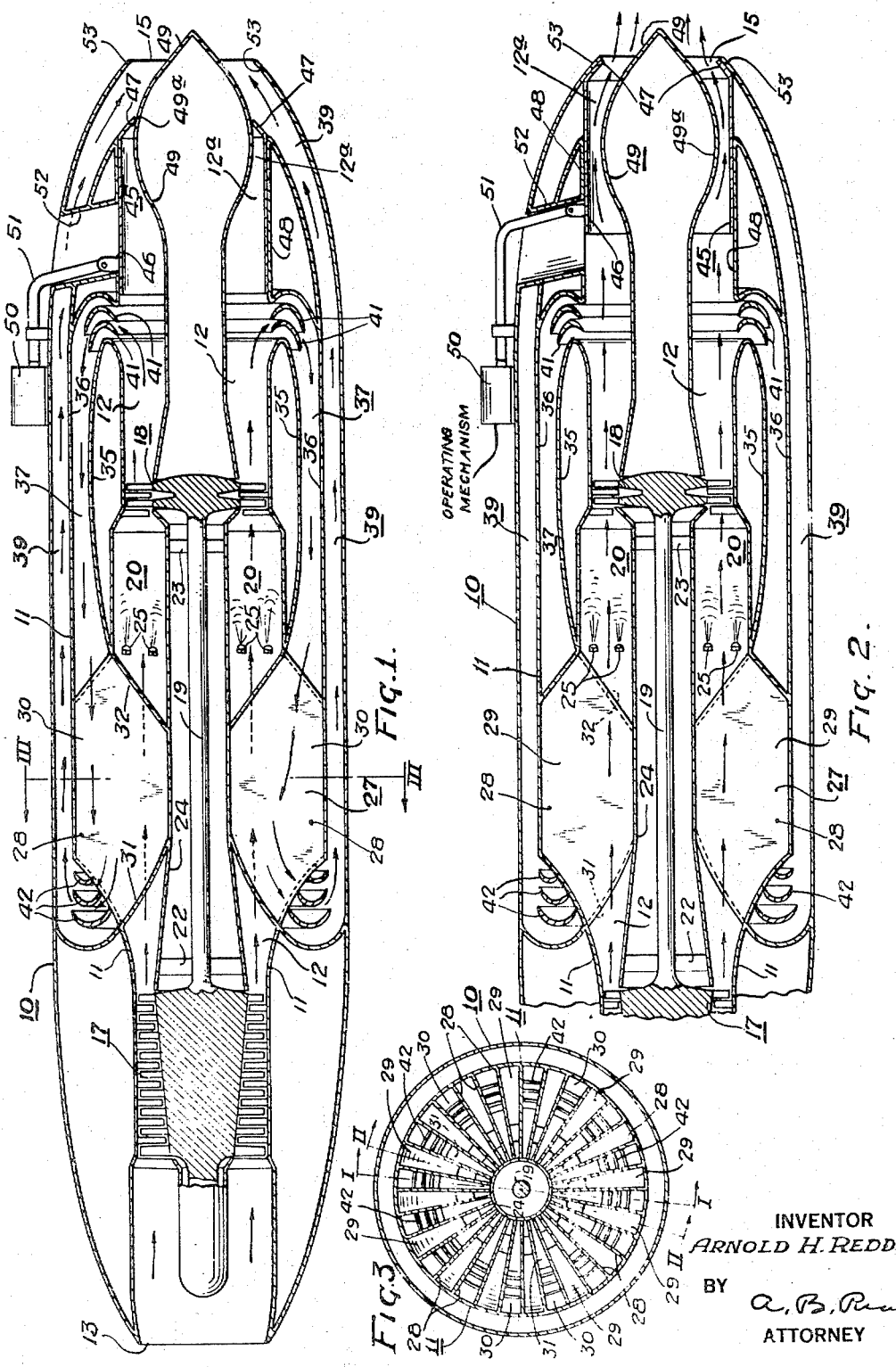

2,516,910

UNITED STATES PATENT OFFICE 2,516,910

GAS TURBINE APPARATUS WITH SELECTIVE REGENERATOR CONTROL

Arnold H. Redding, Swarthmore, Pa., assignor to Westinghouse Electric Corporation, East Pittsburgh, Pa., a corporation of Pennsylvania Application June 2, 1948, Serial No. 30,656

2 Claims. (Cl. 60—35.6)

This invention relates to gas turbine power plants and has for an object the provision of improved combustion apparatus for an aviation gas turbine engine.

It has been proposed to provide means for preheating air delivered by the compressor of a gas turbine power plant prior to flow of such air through the combustion apparatus to the turbine which drives the compressor. For example, hot gases leaving the turbine may be conducted forwardly through suitable communications to a heat exchanger, or regenerator, disposed between the compressor and combustion chamber. Here some of the heat from the turbine exhaust gas is transferred to the compressed air delivered by the compressor, thereby reducing the heat required in the combustion chamber, while effecting reduction in the temperature of the gas flowing from the discharge nozzle. A turbo-jet engine equipped with a heat exchanger is thus adapted to combine improved thermal efficiency with lowered jet velocity. Assuming a given mass of gases to be accelerated in operation of the gas turbine power plant, however, a reduction in jet velocity can be expected to be accompanied by a corresponding reduction in propulsive thrust.

It is another object of the invention to provide an improved gas turbine power plant equipped with regenerator means for effecting desirable fuel economy under favorable or cruising flight conditions, together with control means operable at will to cut the regenerator means out of operation for minimizing flow losses and rendering available maximum propulsive thrust.

These and other objects are effected by the invention as will be apparent from the following description and claims taken in connection with the accompanying drawing, forming a part of this application, in which:

Fig. 1 is a schematic elevational view, mainly in section, of a gas turbine power plant constructed in accordance with the invention;

Fig. 2 is a similar view of the power plant shown in Fig. 1, illustrating a different position of the valve apparatus controlling the flow of turbine exhaust gases; and, Fig. 3 is a sectional view taken substantially along the line III—III of Fig. 1, and indicating by lines I—I and II—II the approximate sections of the apparatus illustrated in Figs. 1 and 2, respectively.

Referring to Fig. 1 of the drawing, the power plant therein illustrated in diagrammatic form comprises a streamlined outer casing structure 10 having mounted therein a sectional inner casing structure indicated generally by the reference character 11, through which is formed a main flow passageway 12, which extends longitudinally through the power plant from a forwardly directed air intake opening 13 to a rearwardly disposed annular discharge or jet nozzle 15. The conventional elements of the power plant are contained within the casing structure 10—11 and include an axial-flow compressor 17, turbine 18 operatively connected thereto through the medium of a common shaft 19, and annular fuel combustion apparatus 20 interposed between the compressor and turbine. Suitable bearings, such as bearings 22 and 23, may be provided for rotatably supporting the shaft 19 within a tubular inner housing 24, which is in turn adapted to be supported within the casing structure 10—11 through the medium of radial struts, not shown in the drawing. The annular combustion apparatus 20 may be of any desired construction and is consequently not illustrated in detail, it being understood that this apparatus includes suitable means, such as nozzles 25, for supplying atomized fuel. The elements of the gas turbine power plant just identified are adapted to operate in the well-known manner as follows: Air entering the intake opening 13 is compressed by the axial-flow compressor 17 and is delivered by way of the passageway 12 to the combustion apparatus 20, from which heated motive fluid is expanded through the turbine 18 and ultimately discharged through the nozzle 15 in the form of a jet establishing a propulsive thrust.

According to the invention, an annular heat exchanger or regenerator structure 27 is interposed in the passageway 12 between the discharge end of the compressor 17 and the combustion apparatus 20. The regenerator 27 may be of any suitable construction, and in the form illustrated in the drawing, may comprise a plurality of radially disposed walls 28, shown in Fig. 3, which are adapted to form a number of radial passages 29 connecting the annular passageway 12 with the combustion apparatus 20. The radial passages 29 are separated by intervening radial passages 30, which are formed between alternate pairs of the walls 28 and interposed between end walls 31 and 32 (see Fig. 1), and thus do not communicate directly with the passageway 12 or the combustion apparatus 20.

For providing a by-pass communication through which turbine exhaust gases can be conducted through the passages 30 of the regenerator structure 27, the inner casing structure 11 is equipped with spaced annular walls 35 and 36 which are mounted concentrically within the outer casing structure 10 to form an annular by-pass communication 37 connecting the passageway 12 adjacent the discharge side of the turbine 18 with the radial passages 30 of the regenerator 27, and an outer annular by-pass communication 39, which leads from the passages 30 to the nozzle 15. As shown in the drawing, the annular by-pass communication 37 is adapted to establish reverse flow of the exhaust gases discharged from the turbine 18 into the passageway 12. In order to effect such reverse flow with minimum frictional flow loss, the portion of the by-pass communication 37 adjacent the passageway 12 may be suitably curved and equipped with arcuate splitter vanes 41, which are adapted to distribute the discharge gases uniformly. Similarly, the forward end of the outer annular by-pass communication 39 may be rounded and provided with arcuate annular splitter vanes 42 for ensuring uniform distribution of the gases supplied thereto from the heat exchanger or regenerator structure 27.

As already pointed out, the invention provides means for selectively cutting the heat exchanger or regenerator in or out of operation, in accordance with operating conditions encountered while the power plant is in service. As diagrammatically illustrated in Figs. 1 and 2, this feature of the invention comprises a movable valve apparatus indicated generally at 45, which is mounted near the nozzle 15 for controlling flow of gases thereto from either the passageway 12 or the by-pass communication 39. In the form of the valve apparatus 45 shown, a cylindrical valve member 46 having a rearwardly disposed annular flange 47 is slidably mounted in an annular section 48 of the casing structure, and partially surrounds a stationary tailpiece or core section 49 that is suitably supported within the casing structure by means of radial struts (not shown). The tailpiece 49 preferably terminates in an end portion centered within the annular nozzle 15, and includes an enlarged portion 49a which is adapted to be engaged by the annular flange 47 of the valve member 46 when the latter is moved forwardly into the position illustrated in Fig. 1. For operating the valve member 46 there is provided a suitable operating mechanism 50, which may be operatively connected to the valve member through the medium of an operating arm 51 that is adapted to be shifted forwardly or backwardly with respect to the casing structure 10. The arm 51 may be suitably bent for extension through a hollow strut 52 connected to the outer casing structure 10 and to the annular section 48. When the arm 51 is moved backwardly or to the right, as viewed in Fig. 2, the valve member 46 is shifted axially to a position in which the flange 47 is held in sealing engagement with the annular margin 53 of the casing structure defining the nozzle 15.

In operation, assuming that the actuating mechanism 15 is operated to shift the valve member 46 to its outermost position, as shown in Fig. 2, the maximum thrust for which the power plant is designed is rendered available, due to closure of the by-pass communication 39 and opening of the direct turbine exhaust communication from the passageway 12 to the nozzle 15. As indicated by the arrows in Fig. 2, motive fluid delivered by the compressor 17 is thus conducted in a relatively straight path through the now inoperative regenerator 27, combustion apparatus 20, and through the blading of the turbine 18 for discharge through the passageway 12, the annular portion 12a thereof formed between the valve member 46 and the tailpiece 49, and nozzle 15.

When it is desired to effect a change in the operation of the power plant from the non-regenerative operation just explained to regenerative operation, the heat exchanger or regenerator 27 may be rendered operative by movement of the valve member 46 forwardly to the position in which it is illustrated in Fig. 1. With the valve member 46 in this position, communication by way of the passageway 12a therein is closed, while flow communication is established between the by-pass communication 39 and the annular nozzle 15. Motive fluid exhausted from the turbine 18 is thus forced to flow from the passageway 12 through the by-pass communication 37, radial passages 30 in the regenerator structure 27 and by-pass communication 39 for discharge through the nozzle 15. In flowing through the passages 30 in the regenerator structure 27, the discharge gases give up a portion of the heat of combustion, previously acquired in combustion apparatus 20, to the compressed air being supplied from the compressor 17 by way of the passages 29 to the combustion apparatus.

While the propulsive effort of the jet issuing from the nozzle 15 during regenerative operation may be expected to be somewhat lower than would be the case with the apparatus conditioned as shown in Fig. 2, the economy and increased thermal efficiency resulting from a lower specific fuel consumption will improve the cruising range of the aircraft with which the power plant is equipped.

While the invention has been shown in but one form, it will be obvious to those skilled in the art that it is not so limited, but is susceptible of various changes and modifications without departing from the spirit thereof.

What is claimed is:

1. In a gas turbine power plant comprising casing structure having an inner annular passageway communicating with an air inlet and a discharge nozzle, a compressor disposed in said structure adjacent said inlet, fuel combustion apparatus, a turbine responsive to flow of motive fluid from said combustion apparatus for operating said compressor and normally adapted to exhaust directly through said nozzle, an outer annular by-pass formed in said casing structure for providing another communication for conducting exhaust fluid from said turbine to said nozzle, and annular heat exchange structure interposed in said by-pass in thermal relation with a portion of said inner passageway in advance of said combustion apparatus.

2. In a gas turbine power plant comprising casing structure having an inner annular passageway communicating with an air inlet and a discharge nozzle, a compressor disposed in said structure adjacent said inlet, fuel combustion apparatus, a turbine responsive to flow of motive fluid from said combustion apparatus for operating said compressor and normally adapted to exhaust directly through said nozzle, an outer annular by-pass formed in said casing structure for providing another communication for conducting exhaust fluid from said turbine to said nozzle, annular heat exchange structure interposed in said by-pass in thermal relation with said passageway in advance of said combustion apparatus, annular valve means mounted in said casing structure for selectively controlling flow of turbine exhaust fluid to said nozzle, said valve means including a member movable in one direction for cutting off communication through said by-pass while establishing communication directly from said turbine to said nozzle, said member being movable in another direction for opening said by-pass while cutting off said direct turbine exhaust communication and actuating mechanism operatively connected to said movable member.

ARNOLD H. REDDING.

REFERENCES CITED

The following references are of record in the file of this patent:

UNITED STATES PATENTS

| Number | Name | Date |
| --- | --- | --- |
| 2,162,956 | Lysholm | June 20, 1939 |

FOREIGN PATENTS

| Number | Country | Date |
| --- | --- | --- |
| 576,094 | Great Britain | Mar. 19, 1946 |
| 410,078 | Germany | Feb. 23, 1925 |